June 19, 1956  S. JEFFERSON ET AL  2,751,534
INDUCTIVELY EFFECTED REMOTE CONTROL
FOR PLURAL ELECTRIC MOTORS
Filed Nov. 14, 1951
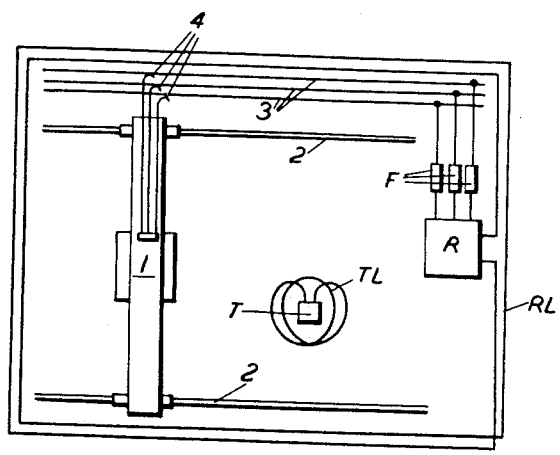
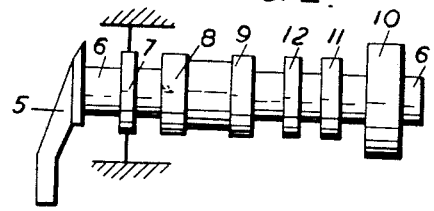
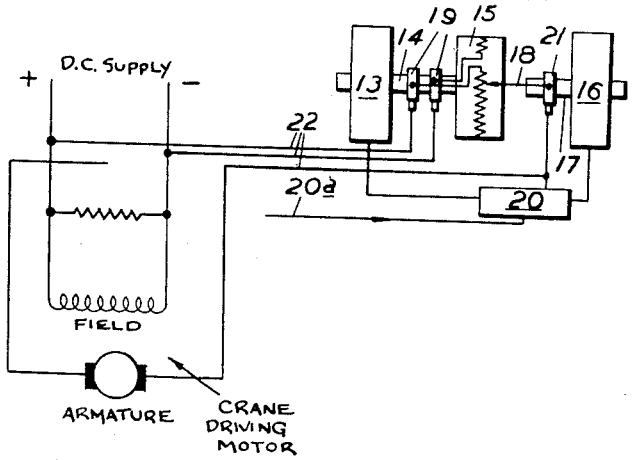
Inventors

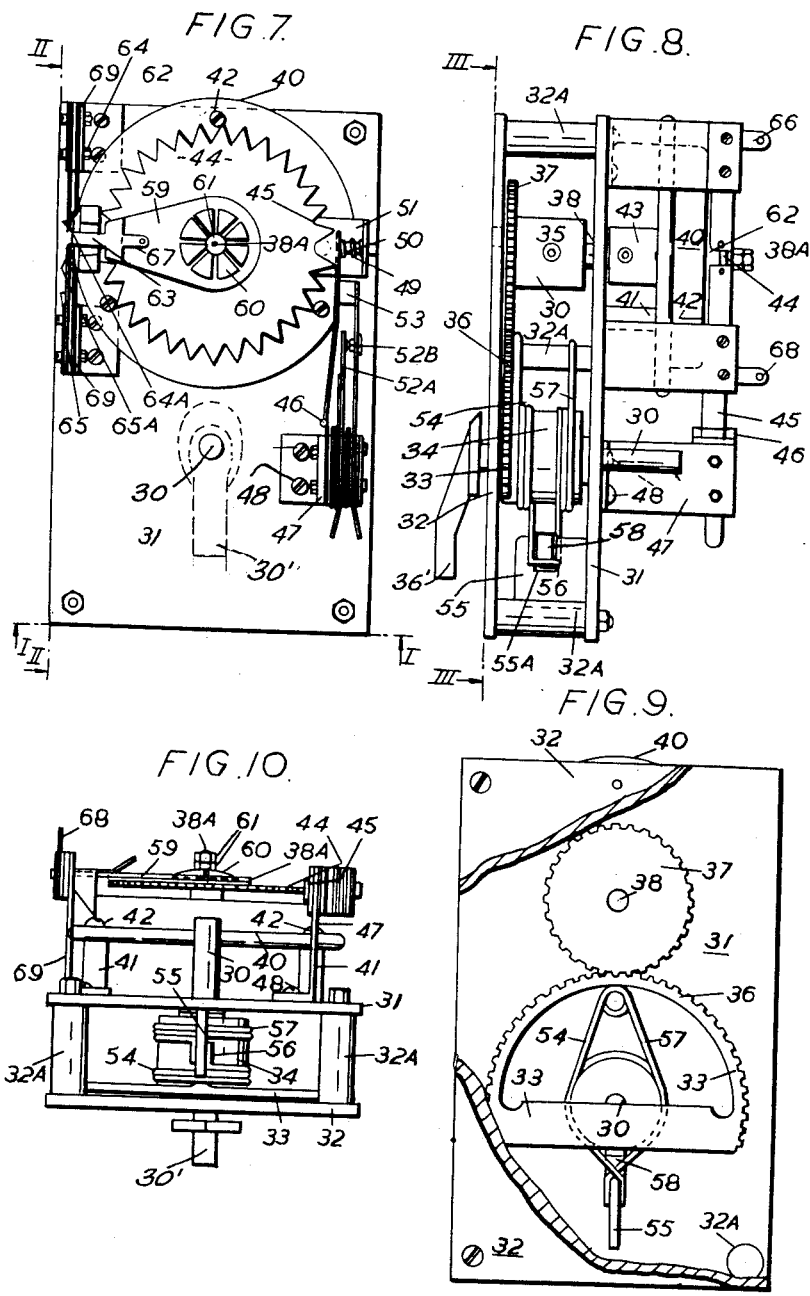

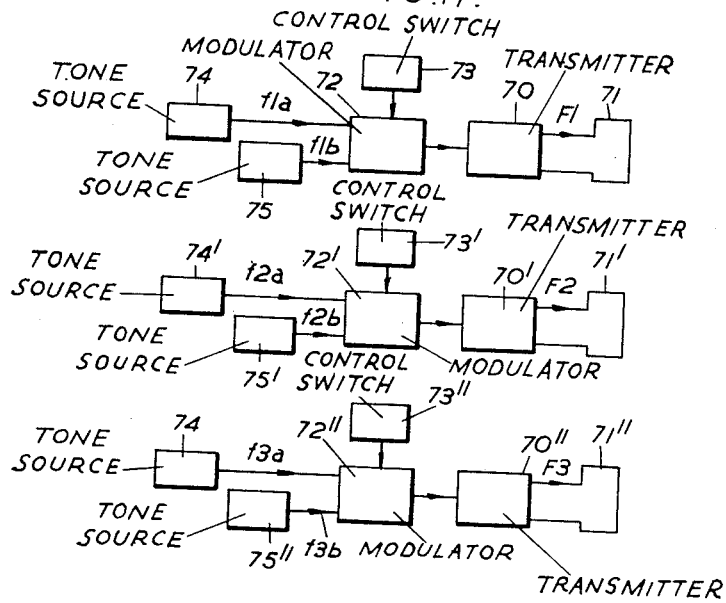
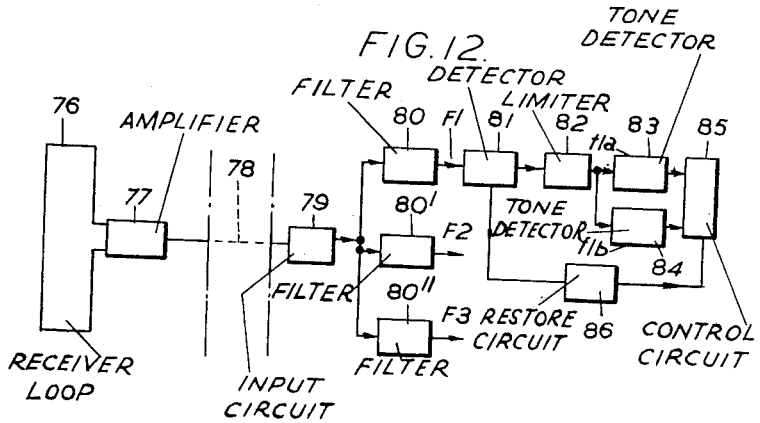

June 19, 1956
S. JEFFERSON ET AL
2,751,534
INDUCTIVELY EFFECTED REMOTE CONTROL
FOR PLURAL ELECTRIC MOTORS
Filed Nov. 14, 1951
6 Sheets-Sheet 5
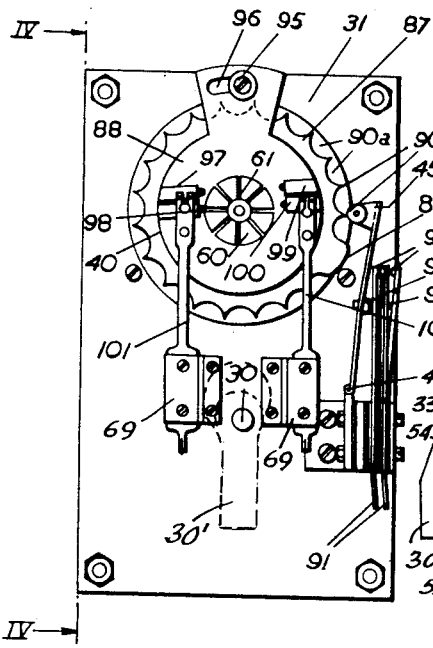
FIG.13.
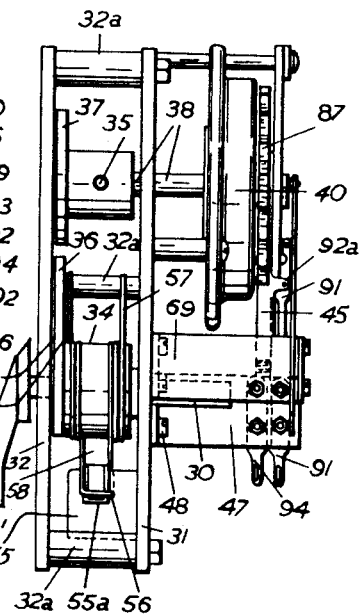
FIG.14.
FIG.15.
Inventors
By
Attorneys

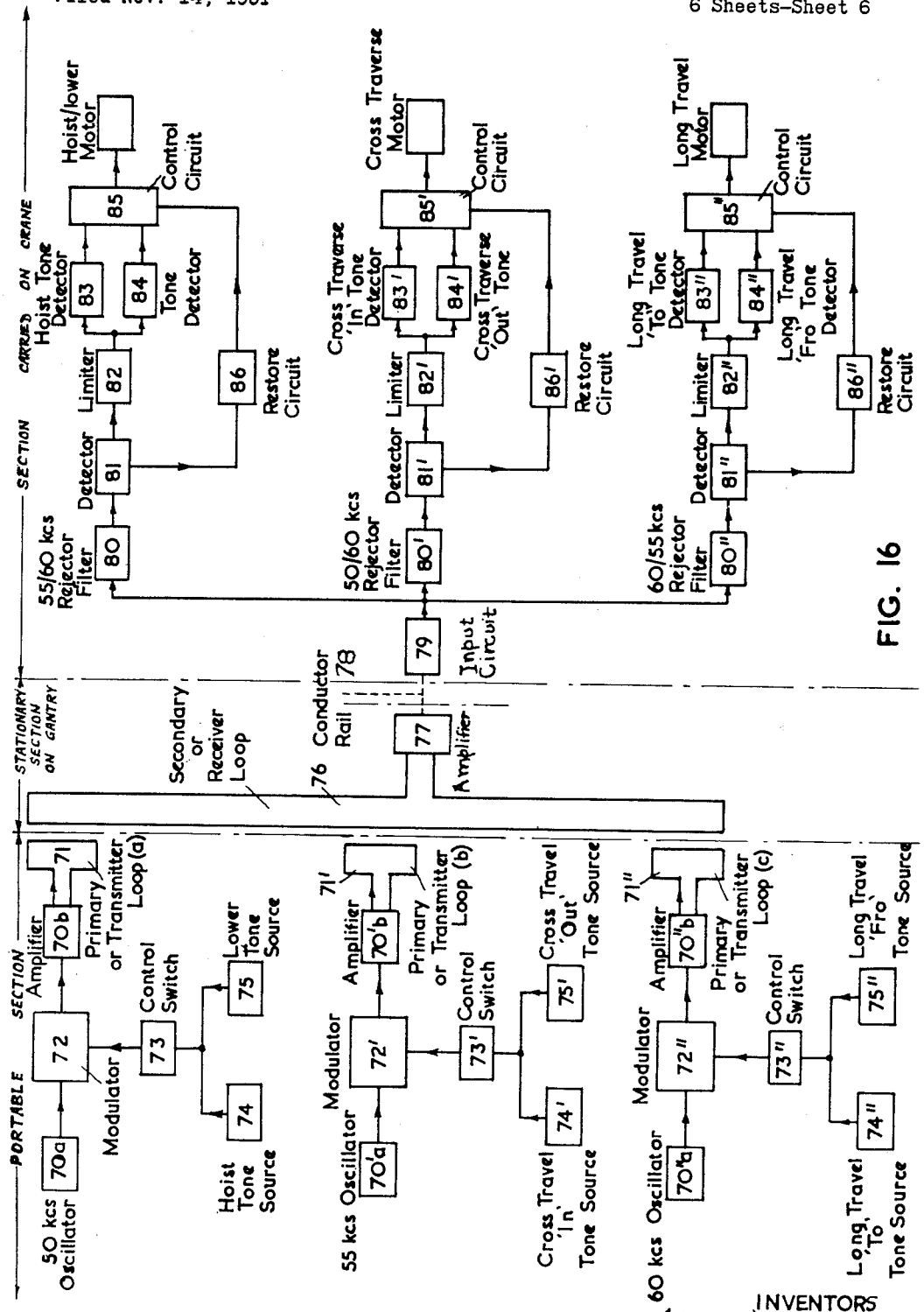

United States Patent Office 2,751,534
Patented June 19, 1956

2,751,534
INDUCTIVELY EFFECTED REMOTE CONTROL FOR PLURAL ELECTRIC MOTORS

Sidney Jefferson, London, and Joseph Garden, Worcester, England

Application November 14, 1951, Serial No. 256,344

19 Claims. (Cl. 318—16)

This invention relates to remote control systems of the kind in which remote control is required to be exercised over short distances and in which the remote control is exercised without recourse to material connection between the remote controlling means and the means which it is desired to control.

The invention has particular but not exclusive application to the remote control of cranes of the gantry or like types. It may also be used, for example, for the remote control of conveyors from a mobile control point or the centralised remote control of a system of conveyors distributed about an area.

It is an object of the invention to provide a remote control system in which the presence in the control area of obstructions to electromagnetic waves or of electromagnetic wave noise generators does not interfere sensibly with the operation of the system.

A further object is to provide such a system which requires only a small and portable controlling means of very small power requirements so that it can be fed with portable batteries.

According to the invention a remote control system comprises a transmitter coupled magnetically to a receiver, said transmitter being controlled to radiate magnetic waves modulated, by the action of a control unit connected to said transmitter, according to the control it is desired to transmit, said receiver being adapted to control an apparatus, the remote control of which is required, according to the modulation of the magnetic waves received from said transmitter.

When a current is caused to flow through a coil in free space, several fields are produced, and these fields vary in the manner in which their amplitude decreases with distance from the coil. The two principal fields are the magnetic induction field and the field due to radiation, and it is known that for a range less than one-tenth of the wave length employed, the magnetic induction field is by far the stronger of the two. Thus, for low power input to the primary coil, a considerable signal can be picked up in a secondary coil, within a specific range, due to the magnetic induction field, the range being determined by the wave length employed.

If a secondary loop is made to enclose an area, it will be appreciated that the most distant point that the primary coil can assume relatively to such secondary loop will be at the central point of such area. Thus, by this means, further range can be obtained with a given power.

Since the power required from the transmitter is proportional to the size and weight of the transmitter, particularly as regards the power supply for the transmitter tube, it is obviously beneficial to keep the required power at a minimum so that the transmitter may be easily portable. Again, since the wave length of the signal is of considerable importance in attaining the object of the invention, it may assist if some consideration is given to the choice of frequency at this point.

It will be appreciated that, while the secondary loop will pick up signals from the primary coil, it will also pick up signals from external sources operating on a similar frequency. Therefore, it is essential that the frequency used should be outside the normal operating broadcast band width. Employment of very high frequencies introduces difficulties in manufacture and also stability, particularly when applied to portable equipment, and also the area coverage is limited for a given power.

This leaves frequencies below the normal broadcasting range, and here the determining factor is the effect of screening due to metal objects. The screening effect is due to eddy-currents being induced in the metal objects, and these eddy-currents increase with frequency, thus it would appear that low frequencies are the best choice from the point of view of range, manufacture, absence of screening and susceptibility to extraneous electrical noises. It is not possible to choose too low a frequency since it is difficult to manufacture a highly selective circuit at low frequency. Therefore, in this instance, a frequency of 50 to 60 kcs. has been chosen.

According to a feature of the invention said transmitter transmits magnetic waves centred on one frequency and modulated according to the position and movement from a datum position of one control member in said control unit.

In a remote control system it is usually necessary to provide control of direction and speed of drive for the controlled apparatus and also for the time for which the drive is maintained. These various controls may be introduced by controlling the modulation in respect of its frequency and by dividing the modulation into pulse signals the number of pulses, their amplitude, their length and their recurrence frequency being used variously to provide the different control parameters.

This modulation may be so arranged as to provide a group of pulses proportional in number to the movement from the datum position and an enduring pulse as long as the control member remains stationary but not at the datum position. For movement in one of two directions the direction of movement of the control member is distinguishably transmitted for example by chopping the modulation when the control member moves in one direction. When the control member is at its datum position no modulation occurs.

According to a further feature of the invention as employed in the remote control of cranes and in like circumstances, said transmitter has primary loops and transmits at different frequencies each modulated according to the type of control desired from each corresponding one of a plurality of control members (e. g. cross-travel, long travel and hoist and lower) and said receiver is fed from a secondary or receiving loop encircling the area in which control by the control means is required.

According to a yet further feature of the invention said modulation is produced by a control handle coupled to an impulse switch which generates impulses to control the modulation of the transmitter output so that no output occurs when the control handle is at its datum position indicating no action to the controlled means, and pulses are transmitted proportional in number to the displacement applied to said control handle to increase or decrease the speed of the action of the controlled means in accordance with the direction of displacement, said control handle also operating a sensing switch which causes the pulses transmitted to be chopped for one direction of displacement and unchopped for the other direction of displacement whereby the controlled means is controlled in direction, and said impulse switch being controlled by detents to remain operated to give an enduring pulse whenever the control handle is maintained displaced at a position not at the datum to indicate a constant speed.

According to yet a further feature of the invention a control potentiometer is provided in the controlled means to provide for control of the action of the controlled means. The potentiometer body rotates with the shaft of a first rotation means and its wiper is rotated by the shaft of a second rotation means. These rotation means may be arranged to move step-wise directly in response to impulses and so, by making one rotation means respond correspondingly to unchopped pulses received and one respond correspondingly to chopped pulses received, the relative position of the potentiometer body and wiper depends upon the displacement of the control handle; hence the electrical output obtainable from the potentiometer is able to control an action of the crane in both speed and direction according to the setting of the control handle.

According to a feature of the invention in another aspect said transmitter modulates magnetic waves centered on a carrier frequency with a tone whose frequency is determined according to the direction of displacement of a control member. The carrier frequency is maintained whenever the control member is not at its datum position and the equipment is so arranged that the absence of carrier restores the controlled apparatus to a state corresponding to the datum position of the control member.

According to a still further feature of the invention modulation of said carrier by a tone is maintained throughout any period in which the increase or decrease of any controlled parameter is required.

The manner in which the invention is carried out will now be described with reference to the accompanying drawings in which:

Fig. 1 shows a diagrammatic layout of a crane system employing a remote control system according to the invention.

Fig. 2 shows schematically an arrangement of a control member in the transmitter of the system of Fig. 1, Fig. 3 shows diagrammatically the arrangement of a control potentiometer in the crane of the system of Fig. 1.

Fig. 7 shows a view of a control switch used in the invention,

Figure 4:
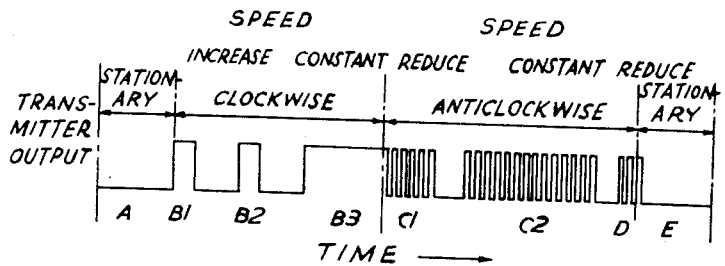
Fig. 4 illustrates the type of carrier modulation used in the system of Fig. 1.

Fig. 8 shows an elevational view of the control switch of Fig. 7 looking in the direction of the arrows 11, Fig. 9 shows a cut-away rear view of the control switch of Fig. 7, Fig. 10 shows a further elevational view of the control switch of Fig. 7 looking in the direction of the arrows 1, Fig. 11 shows a block diagram of a transmitter arrangement used in the invention, Fig. 12 shows a block diagram of a receiver arrangement used with the transmitter of Fig. 11, Fig. 13 shows a view of a control switch used in the arrangement of Fig. 11, Fig. 14 shows an elevational view of the control switch of Fig. 13, Fig. 15 shows a sequence of operations for the equipment of Figs. 11 to 14, and Fig. 16 is a diagrammatic view of the overall system.

In Fig. 1 a gantry crane 1 runs on overhead rails 2 and collects three-phase A. C. power from an appropriate set of power lines 3 by means of a set of collectors 4.

A portable transmitter T is coupled magnetically by its own loop TL to a stationary receiver R by means of another loop RL which surrounds the area in which the crane 1 and the portable transmitter T are intended to work. Frequencies around 50 kc./s. have been found very suitable for such magnetic coupling. The choice of frequency is determined by the spectrum of electrical "noise" in the working area.

For each identifiable action, in this case (a) cross travel, (b) long travel, (c) hoist and lower, of the crane 1 the transmitter T is able to transmit on a separate frequency so that signals representing the various controlling instructions to the crane may be passed on separate channels by the transmitter T to the receiver R. The actual control of the transmitter to this end will be dealt with in due course. The receiver R receives these signals and injects through the filters F into the power supply lines 3, corresponding high frequency control signals for the crane 1. The crane 1 is adapted to respond to these signals and functions therefore according to the controlling signals initiated by an operator at the transmitter T. The transmitter T includes suitable control means for this purpose, the controls on such means being conveniently arranged to be the same as those used on the crane itself for local control, and is battery driven to facilitate movement about the area.

For any one action of the crane 1 it is necessary to modulate a corresponding frequency of the transmitter T so that unambiguous instructions may be conveyed by the modulation for control of speed and direction, e. g. in the action (a), speed of cross-travel and direction of cross-travel. For each action, the transmitter T has a control member or handle which controls a switch and may be rotated about a datum position which is conveniently its mid-position and which corresponds to the crane 1 being stationary in that action. Movement of the control handle from the mid-position indicates the speed required of the crane 1; the direction of movement required of the crane 1 is indicated by the sense of the displacement of the control handle from the mid-position, i. e. anti-clockwise for one direction of movement and clockwise for the other direction.

In the diagram of Fig. 2 a control handle shown at 5 is fixed to a shaft 6. A spring-loaded automatic restoring arrangement of the "dead-man's handle" type is shown diagrammatically at 7; its action will be referred to in more detail later. Also coupled to the shaft 6 is a spring or friction coupling 8 which actuates a sensing switch 9 conveniently mounted concentrically on the same shaft 6. In its operation the sensing switch 9 ensures that the modulation of the transmitter T is distinctive of the direction of displacement, clockwise or anticlockwise, of the control handle. The details of the modulation changes effected will be described later but it will be seen that one of the requirements for the instructions conveyed by the modulation, to wit, to indicate direction of displacement of the control handle, is met by this use of the sensing switch 9.

Now, in order to cater for instructions, by way of modulation, for speed control, an impulse switch 10 is driven by the shaft 6. When the control handle 5 is rotated away from the mid-position (stationary condition in the corresponding action of crane 1) to indicate by its displacement the speed of rotation required, the impulse switch 10 generates impulses which make the transmitter T transmit a corresponding series of pulses. The angle of rotation of the impulse switch 10 indicating as it does the speed required, determines the number of pulses transmitted and it is arranged that, whenever it comes to rest, except of course at its mid-position, the impulse switch 10 remains operated to transmit an impulse which endures as long as the control handle 5 remains displaced, to indicate a constant speed.

To this end the movement of the impulse switch 10 is controlled by detents (not shown) which ensure that the impulse switch 10 remains in the condition of transmitting an impulse, when it rests after rotation from its mid-position, irrespective of any small variations possible in the positioning, by the control handle 5 of the shaft 6. To enable the detents to act, the impulse switch 10 is driven through a spring coupling 11 which allows the impulse switch 10 to be positioned in its nearest operated condition even though the handle 5 should be rotated a little beyond or a little short of the exact position.

Finally, in order that the transmitter may transmit the pulses at a constant rate, the impulse switch 10 is governed, to run at a constant speed when actuated by the shaft 6, by a governor 12 connected to the shaft 6.

Referring again to the sensing switch 9 it may be stated at this point that the transmitted pulses are transmitted without modification when the sensing switch 9 is in the position corresponding say, for example, to clockwise rotation of the control handle 5, and are transmitted after being chopped when the sensing switch 9 is in the position corresponding to anti-clockwise rotation of the control handle 5. The chopping frequency produced by the modulator is arranged to be lower than the transmitter frequency but higher than the pulse recurrence of the transmitted pulses.

In the receiver R are provided means by which the transmitted pulses from the transmitter T may be received and passed to the crane 1, through the filters F and the power line 3. In the crane 1 one control unit is provided to control one action in response to one only of the transmitter frequencies, that is to say, each control unit is arranged to control the crane 1 in accordance with the instructions embodied in the pulses modulating a particular corresponding carrier frequency of the transmitter T.

In Fig. 3 is shown an important part of such a control unit. A first stepping motor 13 is fastened to a shaft 14 to which is fastened a cylindrical potentiometer winding shown diagrammatically at 15 which controls the speed and direction of operation of one of the crane motors. The ends of the potentiometer winding 15 are connected to slip rings 19 fastened on the shaft 14. To a shaft 17, on the same axis as the shaft 14 but not connected thereto, is fastened a second stepping motor 16. The motor 16 drives a wiper 18 which rotates around and bears on the potentiometer winding 15.

Pulses corresponding to the modulated transmitter output are received, from the receiver R via the power line 3 (Fig. 1), by a control circuit 20 (Fig. 3) over a line 20a which is connected by a suitable circuit to the appropriate conductor of the power line 3. The control unit 20 is so arranged that the first stepping motor 13 steps whenever unchopped pulses are received and the second stepping motor 16 steps whenever chopped pulses are received. The relative position of the potentiometer winding 15 and the potentiometer wipper 18 is thus, always indicative of the displacement, away from the mid-position of the control handle 5. This relative position is used in the crane 1 to control the speed and direction of a given action of the crane 1. The crane operating circuits (not shown) for doing this may be of known form and need not be pursued further here.

The slip-rings 19 connected to the potentiometer winding 15 are connected to the field winding of one of the crane operating motors, and a slip-ring 21 connected to the wiper 18 is connected to the armature winding of the respective motor by the leads 22 as shown in Fig. 3, to enable control of the crane 1 to be effected.

To distinguish between the stationary condition of the action and the constant speed condition the elongated pulse which occurs at the conclusion of any movement of the control handle 5 is used to hold the appropriate stepping motor operated and so lock the part of the potentiometer which it controls (the winding 15 or the wiper 18). It will be appreciated that, in this embodiment the stepping motors are of the forward action type, i. e. the leading edge of an impulse operates the motor to step immediately and the trailing edge merely de-energises the motor without affecting the stepping action. If desired, motors of the so-called reverse-action type may be used but different circuit arrangements, of a kind well-known in the art, would be necessary in the motor control circuit 20 to enable this to be done.

By referring now to Fig. 4, the actual type of modulation employed following the arrangements described above will be more easily seen from the graph of transmitter output which represents time on one axis plotted on the other axis against transmitted power which may consist of sine wave oscillations at the frequency used. With the control handle 5 in the mid-position, i. e. the position for the stationary part of crane action, there is no transmitter output at all as shown by the portion A on the graph. This follows because, as stated before, the impulse switch 10 is unoperated in this position.

If the control handle 5 is moved to increase or decrease speed, the sensing switch 9 operates to apply a chopping action or not to the transmitter carrier according to the direction in which the control handle 5 is moved. In the present example clockwise movement of the handle 5 operates the sensing switch 9 so that no chopping action is applied to the carrier.

According to the angle of rotation of the handle 5 so the impulse switch 10 generates a number of impulses; these modulate the transmitter T so that a pulse is transmitted each time an impulse is generated. These pulses are shown at $B_1$, $B_2$ and $B_3$ on the graph of Fig. 4 and are produced as hereinafter described in connection with Figs. 7 to 14 inclusive, and it will be seen that, the shaft 6 having reached a given position, the impulse switch 10 maintains the last impulse, to endure for the period the shaft 6 is at this displaced position. Thus, when indicating a constant speed, an enduring pulse $B_3$ is transmitted.

As soon as the control handle 5 is reversed from the direction of its displacement, in this case clockwise, i. e. the handle 5 is now turned anti-clockwise, the sensing switch 9 reverses and the impulse switch 10 also reverses and generates impulses as the shaft 6 is turned anti-clockwise. These pulses correspond to those sent out when the speed was being increased, but differ in modulation, since, when operation of the sensing switch 9 occurs, the pulse output is chopped. It will be noted that the change of the sensing switch 9 provided a pulse $C_1$ of the right modulation for the new direction from the previously enduring pulse.

When the control handle 5 is partially restored to the mid (stationary) position a chopped pulse is transmitted as shown at $C_2$ and, because the speed is to remain constant at its reduced value, the pulse $C_2$ endures until the control handle 5 is restored say to the mid-position. Then a pulse would be transmitted as at D and the transmitter output would then cease as at E.

Should the control handle 5 now be moved still further in an anti-clockwise direction chopped pulses will still be transmitted indicating that the crane action must now be reversed and the speed increased, in the opposite direction, from the stationary condition. Then, turning the control handle 5 in a clockwise direction causes unchopped pulses to be transmitted but this time indicates that the speed must be reduced.

Referring again to Fig. 3, for the conditions postulated in the last paragraph, it will be easily seen that the potentiometer arrangement is such that, by virtue of the first and second stepping motors, its output reverses accordingly and correct operation ensues.

Figure 6:
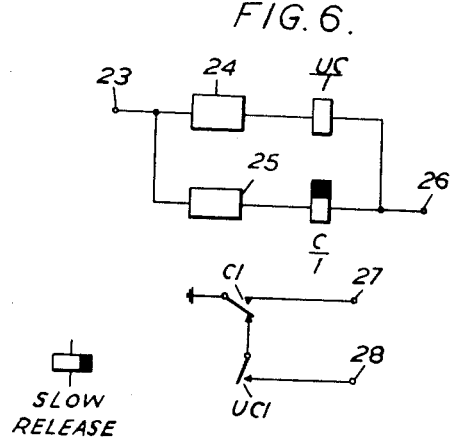
Fig. 6 shows, in a detached contact type of diagram, a part of the control unit circuit.

Referring now to Fig. 6 an arrangement is shown by which the unchopped and the chopped pulses for a given action may be distinguished and applied respectively to the appropriate stepping motors 13 and 16 contained in the control unit corresponding to that action.

The receiver output is received at the given control unit where it is demodulated and applied to a terminal 23 from which it is fed simultaneously to two detecting circuits 24 and 25. These circuits 24 and 25 are connected to a source of high tension power by a terminal 26, relays UC and C being connected in series with the respective high tension connections. The circuit 24 amplifies the receiver output and operates, after limiting the received pulses, in response to either chopped or unchopped pulses to energise relay UC; the circuit 25 amplifies but operates to energise relay C in response to chopped pulses. Circuit 25 acts by differentiating the pulses and suppressing one polarity of the resulting differentiated waveform. Thus, for an unchopped pulse, the relay C will not be fully energised in the short period of one differentiated pulse whilst for a chopped pulse the equivalent of a differentiated pulse will be present for each chopped part of the chopped pulse and will energise fully the relay C which can then operate. Circuit 24, which does not differentiate the pulses from the receiver after limiting and amplification, merely energises relay UC continuously for the duration of an unchopped pulse and in a chopped manner for the duration of a chopped pulse; relay UC is thus able to operate in response to unchopped pulses and also in response to the chopped pulse owing to its operating and releasing characteristics having been arranged accordingly.

Now contact C1 is able to connect an earth signal to a terminal 27 whenever chopped pulses are received to operate relays C and UC; also by breaking the circuit of contact UC1 contact C1 is able to prevent the simultaneous operation of relay UC1 from connecting an earth signal to a terminal 28. Relay C is also made slow releasing to avoid false impulses on terminal 28. When, however, relay UC operates alone upon the receipt of unchopped pulses an earth signal is connected via the unoperated contact C1 and the operated contact UC1 to the terminal 28.

The connection of terminal 27 to the circuit of stepping motor 16 and the connection of terminal 28 to the circuit of stepping motor 13, via the motor control circuit 20, enables these motors to step respectively when chopped or unchopped pulses are received.

It has been shown that, owing to the arrangement of the control handle 5 and the detents of the impulse switch 10, it is not normally possible for the transmitter output to be zero for a period longer than the period allowed between transmitted pulses. This allows the provision of automatic resetting of the potentiometer in the event of a fault condition such as carrier failure. The control circuit 20 is so arranged by known expedients that if a period longer than an inter-pulse period elapses without the transmission and reception of a pulse the stepping motors 13 and 16 are actuated until the potentiometer has returned to the stationary position. This position is indicated by the wiper 18 being in the mid-voltage point of the winding 15 and, for this purpose, therefore the slip-ring 21 is connected by its brush to the control circuit 20.

The "dead-man's handle" mechanism 7 previously referred to ensures that whenever controlling pressure on the control handle 5 is relieved the handle is automatically restored to the mid-position; the action of the crane is thereby slowed and stopped as the handle 5, in restoring, causes the correct pulses to be transmitted to slow down and stop the action of the crane.

Other safety precautions can be adopted so that for instance, should the transmitter output cease for a longer period than that allowed between pulses, brakes are applied to stop any action left in progress.

Figure 5:
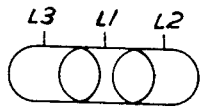
Fig. 5 illustrates a preferred form of loop arrangement used in the invention.

Alternative arrangements of the transmitter T are possible. A preferred arrangement of the loops L1, L2 and L3, for example, is shown in Fig. 5. They are arranged so that the mutual coupling between them is as small as possible.

One constructional form which the control or sensing switch referred to above with reference to Fig. 2 may take is shown in Figs. 7, 8, 9 and 10 and will now be described in detail. A shaft 30, to which any suitable control member such as the handle 30' attached is mounted in two plates 31 and 32. The plates 31 and 32 are spaced apart by pillars 32A. A semi-circular gear-wheel 33 and a drum 34 are mounted on the shaft 30 between the two plates 31 and 32. The gear-wheel 33 meshes on its arcuate portion 36 with a second gear-wheel 37 which is mounted, in bearings, between the plates 31 and 32 on a shaft 38. The second gear-wheel 37 is made fast to the shaft 38 by a set-screw 35 in the bush 39. The shaft 38 extends beyond the plate 31 and is coupled to an impulse shaft 38A by a coupling 43. The shaft 38A is supported in a case plate 40 which is itself supported on the plate 31 by three pillars 41 and screws 42. An impulse or detent cam 44 is mounted on the impulse shaft 38A and a roller arm 45, pivoted at a pivot 46 on a mounting 47 attached to the plate 31 by screws 48, presses against the cam 44. This pressure is maintained by a spring 49 which is located on a pillar 50 on the bracket 51. A "make" spring set 52 comprising contact spring 52A and 52 B is fixed on the mounting 47 so that rotation of the detent cam 44, by moving the roller arm 45 to press against the button 53 on spring 52B, causes the contact springs 52A and B to make and break again as the rotation proceeds through the space of one detent. In the drawing the roller arm 45 is shown at a root of the detent profile of cam 44 with the contact springs 52A and 52B broken. The contact springs 52A and B are arranged to control the modulation of the transmitter frequency. For example when the switch is in its mid position the contact springs 52A and 52B are closed so that the transmitter output is cut-off. When the switch moves from its mid-position the contacts 52A and 52B open and close to modulate the transmitter. During their open periods the transmitter is on.

It will now be apparent from the foregoing that rotation of the shaft 30, either clockwise or anti-clockwise will result in the contact springs 52A and 52B operating a number of times dependent upon the angular rotation of the shaft 30 for a given ratio of the gear-wheels 33 and 37; the transmitter is modulated accordingly. Any convenient movement ratio can be arranged and the choice of a semi-circular gear-wheel 33 is possible in most cases, Suitable stops are provided when required to prevent over-rotation of the shaft 30.

The spring coupling 43 ensures that the spring-loaded roller arm 45 always engages one of the roots of the detent profile of cam 44 to maintain the transmitter on with the switch displaced.

A governor (not shown) is arranged in known manner conveniently within the case plate 40 to ensure that the shaft 38A and the cam 44 rotate at a uniform speed for impulses to be sent out at a uniform speed.

The spring coupling 43 between the shafts 38 and 38A helps to militate against the transmission to the detent arm 44 of sudden movements of the control handle fastened to the shaft 38.

A spring 54 is fastened a one end to a spacing pillar 32A and passes round the drum 34 and is restrained at its other end by a stop 55 on the plate 31. An arm 56 on the other end of spring 54 is positioned across a slot 55A in the stop 55. A second spring 57 is positioned similarly but is wound in the opposite direction round the drum 34. A projection 58 on the drum 34 is arranged to be in the slot 55A when the shaft 30 is in its mid- or datum position. Thus, whenever the shaft 30 is rotated, one or other of the springs 54 and 57 acts in such a manner as to urge the shaft 30 back to its mid- or datum position; the shaft 30 can only be maintained in the displaced position by continuing rotational pressure applied to it by the handle 30'. This is the "dead man's handle" facility referred to previously.

A friction arm 59 is fitted over the end of the shaft 38A and is pressed against the detent cam 44 by means of a spring washer 60 secured by two nuts 61. The pressure between the cam 44 and the friction arm 59 is arranged so that the friction arm 59 will rotate with the cam 44 but will slip and cease to move when it is restrained by a stop. A dual stop 62 is fixed on the case plate 40 and is engaged by an extension 63 of the friction arm 59 whenever the shaft 30 is rotated from its datum or mid-position. The extension 63 also engages at its end, when restrained by the stop 62, one or other of a pair of contacts 64A and 65A on springs 64 and 65 respectively. The springs 64 and 65 are mounted on brackets 69. In this way the sensing switch referred to previously is provided. Connections are taken between the tag 66 of spring 64 and the tag 67 on the extension arm and the tag 68 of the spring 65 and the tag 67.

In action any reversal of the torque applied to the shaft 30 will reverse the direction of rotation of the shaft 38A. Owing to the previous rotation of the shaft 38A the friction arm 59 will be against one of its stops but when the direction of rotation of shaft 38A reverses the friction arm 59 will no longer be pressing against this particular stop and will proceed to move with the cam 44 until its extension 63 encounters the other of the stops when it will slip against the cam 44. Thus, one or other of the contacts 64A or 65A is in connection with the tag 67 through the extension 63 according to the sense or direction of the most recent movement of the transmitter control member or handle 30' attached to the shaft 30.

Another embodiment of the invention will now be described in which a different form of modulation of the transmitter and a different arrangement of feeding and applying information in the receiver loop output to the crane controls are used.

In Fig. 11 a transmitter 70, 70' or 70" is able to feed a loop 71, 71' or 71" respectively under the control of a modulator 72, 72' or 72" which receive the carrier waves respectively at different radio frequencies, each modulator being itself controlled by a control switch 73, 73' or 73". Each control switch is arranged so that by rotating its shaft in either of two directions the output of the respective transmitter is modulated by pulses of tone. The frequency of the tone pulses is different for each direction of rotation. Tone sources 74, 74' and 74" and 75, 75' and 75" supply tones of frequency $f1a$ and $f1b$ respectively to the respective modulator for this purpose.

As in the previous embodiment the control switch movement is arranged to correspond to that of the normal control for an action of a crane. That is, the given crane action is stationary for the mid-position of the switch; for movement of the crane action in one direction the switch is rotated clockwise and for movement in the other direction the switch is rotated anticlockwise. The extent of the rotation of each control switch 73, 73' or 73" in a given direction determines how many pulses of tone modulate the respective transmitter 70, 70' or 70", and a sensing device in each control switch 73, 73' or 73" determines which of the tone sources 74, 74' or 74" and 75, 75' or 75" is used to perform the modulation. Thus, the frequency of the tone modulating the output of the respective transmitter 70, 70' or 70" indicates the direction of rotation of the respective control switch 73, 73' or 73" and therefore the desired direction of movement of the given crane action. Moreover it is arranged that, when the control switch 73, 73' or 73" is displaced from its mid-position, the respective transmitter 70, 70' or 70" is transmitting an unmodulated carrier frequency which ceases whenever the control switch 73 again reaches its mid-position.

Thus, for the different actions of the crane separate transmitters are used together with corresponding ancillary equipment. Each transmitter uses a different carrier frequency (F1, F2, F3) and modulating tones ($f2a$, $f2b$ and $f3a$, $f3b$) may also be different in each case. The frequencies of the modulating tones are conveniently chosen from the range 120 to 1500 C./S.

The transmitters 70, 70', 70" are conveniently arranged in one portable assembly and may have the three loops 71, 71', 71" arranged as described previously with reference to Fig. 5.

Referring now to Fig. 12 a receiver loop 76 comprises a loop round the working area similar to that already described with reference to Fig. 1. The loop 76 is connected to an amplifier 77 whose output is taken to a wire 78 which, in the present case of a crane may be a wire similar to the usual power wire leads to the crane (wires 3 of Fig. 1). From this wire 78 an input mixer 79 on the crane itself is arranged, by using an appropriate pick-up on the wire 78, to collect the output from the amplifier 77. The input circuit 79 comprises a buffer amplifier; its output which may consist of modulated signals of different fundamental frequencies corresponding to the three carrier frequencies (F1, F2, F3) of transmitters 70, 70' and 70" respectively in Fig. 11, is fed to three filters 80, 80', 80". These filters each select one only of the three signals according to its carrier frequency and pass it to a detector 81.

Henceforth only the modulated radio frequency signal corresponding to the basic frequency F1, will be considered, as the functional arrangements for the other two signals F2, and F3 are substantially identical.

The detector 81 rectifies the signal F1 and produces an output of frequency corresponding to the original tone modulation $f1a$ or $f1b$, of the carrier frequency F1. This passes to a limiter 82 and then to a pair of tone detectors 83, 84 one of which responds to modulation frequency $f1a$, the other to modulation frequency $f1b$. The output of each tone detector consists of current impulses corresponding to the tone pulses used in modulating the original carrier frequency F1 and is applied to a control circuit 85 which can conveniently be of the two way stepping type or of the type used in the previous embodiment. Convenient two way stepping switches are of the uniselector type as used in automatic telephone practice but arranged to be controlled by two stopping magnet ratchet arrangements one for each direction of stepping.

Now control switch 73 (Fig. 11) is so arranged that, whenever it is not in its mid-position, the carrier is transmitted whether tone modulation is being applied or not and, whenever the switch is in its mid-position, no carrier is transmitted. Moreover the detector 81 (Fig. 12) can also give an output which corresponds to the carrier level transmitted.

A restore circuit 86 is therefore arranged so that whenever there is no output from the detector 81 it passes an appropriate signal to restore the control circuit 85 so that any movement of the crane taking place at the time, automatically ceases.

This provides an automatic safety precaution in case of carrier failure or, in case of tone failure whilst the control switch is being returned to its mid-position.

Additionally, the restore circuit 86 can be arranged to inhibit operation of the tone detectors 83 and 84 in the absence of the carrier (by cutting off their high tension supply for example). Thus because the restore circuit 86 can be made insensitive to noise peaks, operation of the control circuit 85 due to high power noise peaks, which may actuate the tone detectors 83 and 84 with the control switch in mid-position or with the carrier failed, can be prevented. This facility also acts to secure safety in the event of the transmission, or reception, of carrier failing for any other reason.

It will be appreciated that the operation of restore circuit 86 in the absence of carrier can be arranged to apply the crane brakes automatically either immediately or after the crane control has restored.

A further safety device is the arrangement of a suitable coupling between the two tone detector circuits 83, 84 to ensure that simultaneous operation of both tone detectors prevents any output from either tone detector from being fed to the control circuit 85.

A further refinement consists in the application of automatic gain control to the receiver circuit of Fig. 12. Since the filter circuits 80, 80', 80" will usually be convenient points to maintain desired signal levels, amplifiers incorporated therein will be arranged for automatic gain control.

On the other hand extremely large signals which may be mostly noise and outside the range of the gain control will be limited by the limiter 82.

The arrangement of a control switch to operate as in the embodiment above will now be described with reference to Figs. 13 and 14.

In these figures the arrangement of gear-wheels, "deadman's handle" and the case plate are substantially the same as that described with reference to Figs. 7, 8, 9 and 10. Corresponding elements have therefore been given corresponding reference numbers.

The spring coupling (43) of the previous embodiment is not now essential to the correct functioning of the system but can be included if desired to counteract shocks on the control handle 30'. In the absence of the spring coupling the shaft 38 extends through, and is supported by, the case plate 40. An impulse cam 87 is fastened to the shaft 38 and a friction plate 88 bears on the side of the cam 87. The spring washer 60 maintains the plate 88 against the side of the cam 87.

The cam 87 is arranged so that, when the shaft 30 is in its mid-position the roller arm 45 engages a high crest 89 of the profile of cam 87. With the shaft 30 not in the mid-position it engages the lesser crests 90 as it passes from one root 90a to the other. A spring set 91 on the bracket 47 is operated via a buffer 92 on a side extension 92a of the roller arm 45 and is so arranged that it operates when the roller arm 45 is on the high crest 89 but does not operate as it passes from one root 90a to the other over a lesser crest 90. This spring set 91 can therefore be called the "off-normal" spring set as it only operates when the shaft 30 is not at its mid-position. A second spring set 93 is arranged nearer the plate 31 on the bracket 47 so that it operates from a larger buffer 94 on the roller arm 45. Thus it operates whenever the roller arm 45 passes over the lesser crests 90 as well as for the mid-position of shaft 30. This spring set 93 is shown operated in Fig. 13 with the roller arm 45 just on the point of passing over a lesser crest 90 whilst the spring set 91 is shown unoperated with a space between the buffer 92 and the moving spring of the spring set 91. Spring set 93 is used therefore, to control tone modulation of the carrier and spring set 91 is used to control the carrier itself.

The friction plate 88 moves with the cam 87 only between the limits determined by a screw 95 in a slot 96. Outside such limits the plate 88 slips against the cam 87. The plate 88 only moves therefore, immediately after a change of direction of movement of the cam 87 and hence of the shaft 30. Contact pairs 97, 98 and 99, 100 are fitted on the surface of plate 88 and contact springs 101, 102 respectively bear against the contact pairs.

It will be seen that if, as shown in Fig. 13, the cam 87 turns clockwise, the plate 88 will turn with it until the contact spring 102 has changed from contact 100 to contact 99 and contact spring 101 has changed from contact 97 to 98. In fact, the contact pairs 97, 98 and 99, 100 and the contact springs 101 and 102 are the elements of a sensing switch.

Fig. 16 is a diagrammatic view of a complete control system which includes a transmitter which is substantially like that shown in Fig. 11 and a receiver which is substantially like that shown in Fig. 12. The carrier waves are supplied to the modulators 72, 72' and 72" at relatively different radio frequencies from oscillators 70a, 70'a and 70"a respectively, these frequencies being preferably 50 kcs., 55 kcs. and 60 kcs. respectively, the carrier waves at these different frequencies being passed respectively to the modulators 72, 72' and 72" respectively. The carrier waves at a frequency of 50 kcs. are received by the modulator 72 and are modulated by the tone sources 74 and 75 under control of the control switch 73 to control the hoist and lowering operations of the crane, and the modified carrier waves are amplified by an amplifier 70b and are fed to the primary or transmitter loop 71 the energy of which is received by the secondary or receiver loop 76.

The carrier waves at frequencies of 55 kcs. and 60 kcs. are received respectively by the modulators 72' and 72" connected to the tone sources 74' and 75' and 74" and 75" respectively under control of the respective control switches 73' and 73", and the outputs of the modulators 72' and 72" are amplified by the amplifiers 70'b and 70"b respectively and fed to the primary or transmitter loops 71' and 71" respectively, energy from each of which is received by the secondary or receiver loop 76.

The signals are received from the loop 76 by an amplifier circuit 77 and an input circuit 79 and are filtered by the filters 80, 80' and 80" which are selective to the respective radio frequencies and passed to the signal rectifying detectors 81, 81' and 81" and then to limiters 82, 82' and 82" respectively. The limiter 82 for the frequency of 50 kcs. passes to the pair of tone detectors 83 and 84 which are responsive to the respective modulated frequencies, and the pulses from these tone detectors pass to the control circuit 85 for the crane hoist/lower motor. Similarly, the signals from the filters 80' and 80" for the frequencies 55 kcs. and 60 kcs. respectively are passed to the detectors 81' and 81" and then to the limiters 82' and 82" respectively, the limiter 82' being connected to the tone detectors 83' and 84' for the cross travel of the crane and through the control circuit 85' to the cross traverse crane motor, and the limiter 82" being connected to the tone detectors 83" and 84" for the long travel of the crane, and through the control circuit 85" to the long travel crane motor. 86, 86' and 86"" are the circuits for restoring the control circuits, these restoring circuits being connected to the detectors 81, 81' and 81" and to the respective control circuits 85, 85' and 85".

The operation of a control switch in relation to the modulated and carrier output of the transmitter controlled thereby is illustrated by means of the time diagrams of Fig. 15. In the Fig. 15 it will be appreciated that the number of modulation cycles shown is smaller than would actually be the case and that the depth of modulation also is not to scale. A modulation depth of 80% to 90% would be achieved in practice.

The control switch commences at its mid position; the sensing switch will be in either one position or the other according to the last direction of movement of the control switch, the "modulate" contacts (spring set 93) will be broken and the "off-normal" contacts (spring set 91) will also be broken. If the "off-normal" contacts are arranged to connect the carrier when they are made then at the commencement there will be no transmission, i. e. zero carrier level.

Now consider the control switch to be moved clockwise to increase speed in a clockwise direction. The roller arm 45 moves into the 1st root of the cam 87 and over the 1st crest into the 2nd root. During this action the sensing switch operates in the clockwise direction to connect one tone, say f1a, and the "off-normal" contacts make to connect the carrier F1. The modulate contacts make as the arm 45 moves into the 1st root, break for 1st crest and then make again for the 2nd root. Thus, if it is assumed that breaking the modulate contacts allows a tone modulation of the carrier the carrier will have been modulated by one pulse of tone, f1a. This is shown in the curve of carrier level.

Now consider the control switch to be moved anti-clockwise to reduce speed in the clockwise direction. The roller arm 45 moves back out of the 2nd root, into the 1st root over the 1st crest. The direction of movement is reversed so that the sensing switch operates and arranges for modulation with tone f1b whilst the "off-normal" contacts remain made to maintain the carrier. The modulate contacts operate and connect a pulse of tone f1b to modulate the carrier thereby indicating a decrease in speed. Finally the roller arm 45 reaches the higher crest 89, the "off-normal" contacts break again and the carrier transmission ceases.

Now consider that movement of the control switch continues in the anticlockwise direction to increase speed in the anticlockwise direction. The "off-normal" contacts reoperate to reconnect the carrier and the sensing switch remains in the anticlockwise position to ensure that modulation is by tone $f1b$. The "modulate" contacts operate to cause modulation of the transmitter by tone $f1b$ as the roller arm 45 passes into the 1st anticlockwise root and over the 1st crest into the 2nd root. The modulation in this case is by the tone $f1b$; in the original movement clockwise it was by the other tone $f1a$. It is easily seen that the modulation during restoration of the control switch clockwise from the 2nd anticlockwise root is also the opposite of the original restoration.

Additionally it should be noted that, although the system described uses three independent control channels capable of simultaneous operation if necessary, it may be wasteful to provide for such working if simultaneous operation is not necessary. In such circumstances it would be possible to reduce the numbers of certain parts of the equipment. For instance, where only one action is required at any one time one carrier only need be used but modulated as required at separate times with any one of the tone modulation frequencies.

Although the invention has been described with reference to control circuits of the step-by-step type it will be apparent to those to whom this specification is addressed that the tone modulation to indicate speed decrease or increase can be made continuous instead of in pulse form and the corresponding continuous output of the tone detectors can then be used to control the operation of motor-driven contactors for large motor speed control for example.

We claim:

1. In a control system for the remote control of apparatus including a transmitter comprising a magnetic wave generating means, a magnetic wave launching means and a control unit having a control member capable of being distinctively set in accordance with the control desired at the remote apparatus and able to modulate the transmitter output in accordance therewith, said transmitter being mobile within a given working area, and a receiver for receiving magnetic waves, a demodulating means to demodulate magnetic wave signals received from said transmitter and a controlling means for controlling said apparatus in accordance with demodulated signals received from the demodulating means, the combination with said receiver of a loop antenna connected to said receiver and surrounding the working area within which the transmitter operates and which is responsive to the magnetic waves launched by the transmitter but is non-responsive to magnetic wave interference in the vicinity of said working area.

2. A system in accordance with claim 1, wherein said means for controlling said apparatus is responsive to a signal indicating the magnitude and sense of a controlling adjustment, said control member is movable about a datum position in each of two directions, said modulating means provided in said control unit is responsive to the sense and magnitude of the movement of said control member, and said modulating means effecting modulation of the transmitter output by a number of pulses according to the magnitude of the movement of the control member and in a form determined by the direction of the movement of the control member, and the demodulating means of said receiver thereby producing a signal output indicating the magnitude and sense of a desired controlling adjustment in accordance with the number of pulses and the form of modulation of the transmitter transmission.

3. A system in accordance with claim 2, wherein said control unit comprises an impulsing means and a sensing means, said impulsing means being responsive to movement of said control member and controlling the modulating means so that the transmitter transmits pulses as the control member is moved, and said sensing means being responsive to a change of direction of said control member to control the modulating means so that pulses of one particular form of modulation are transmitted by the transmitter according to the direction of movement of said control member.

4. A system in accordance with claim 3, wherein said sensing means controls said modulating means to modulate the transmitted pulses in a chopped form for one direction of movement of said control member.

5. A system in accordance with claim 4, including means for controlling said impulsing means to maintain the last pulse of a group of transmitted pulses until the control member is moved again after being moved into a displaced position to effect the transmission of a group of pulses.

6. A system in accordance with claim 3, wherein said control unit comprises two sources of different tone, said sensing means controls the modulating application of one source of tone to the output of said transmitter by said modulating means for one direction of movement of said control member and of the second source of tone to the output of said transmitter by said modulating means for the other direction of movement of said control member, and said impulsing means controls the modulation of the output of the transmitter by said modulating means for each tone whereby the output of said transmitter is modulated by pulses of tone according to the direction of movement of said control member.

7. A system in accordance with claim 6, wherein said control member comprises an off-normal switch which operates whenever said control member is moved from its datum position, and said off-normal switch is associated with said transmitter and serves when operated to control the output of the transmitter.

8. A system in accordance with claim 3, wherein said sensing means comprises a first rotatable member adapted to rotate accordingly as the control member is moved in one direction or the other, a second rotatable member frictionally coupled to said first member and capable of rotation therewith, a first stop adapted to restrain rotation of said second member after a small movement in one direction and to cause it henceforth to slip as long as said first member continues to rotate in the one direction, a second stop adapted to restrain rotation of said second member after a small movement in the other direction and to cause it henceforth to slip as long as said first member continues to rotate in the other direction, said small movement being such that no impulse is transmitted before its completion, a pair of contacts attached to said second member and a third fixed contact so arranged that said third contact makes contact with one of said pair of contacts when the second member is moved towards said first stop and with the other of said pair of contacts when the second member is moved against the second stop, said pair of contacts and said third contact being connected to control the modulating means in respect of its form determining property.

9. A system in accordance with claim 4, wherein said sensing means comprises a first rotatable member adapted to rotate accordingly as the control member is moved in one direction or the other, a second rotatable member frictionally coupled to said first member and capable of rotation therewith, a first stop adapted to restrain rotation of said second member after a small movement in one direction and to cause it henceforth to slip as long as said first member continues to rotate in the one direction, a second stop adapted to restrain rotation of said second member after a small movement in the other direction and to cause it henceforth to slip as long as said first member continues to rotate in the other direction, said small movement being such that no impulse is transmitted before its completion, a pair of contacts attached to and rotatable with said second member and a third fixed contact so arranged that said third contact makes contact with one of said pair of contacts when the second member is moved towards said first stop and with the other of said pair of contacts when the second member is moved against the second stop, said pair of contacts and said third contact being connected to control the modulating means in respect of its form determining property.

10. A system in accordance with claim 5, wherein said sensing means comprises a first rotatable member adapted to rotate accordingly as the control member is moved in one direction or the other, a second rotatable member frictionally coupled to said first member and capable of rotation therewith, a first stop adapted to restrain rotation of said second member after a small movement in one direction and to cause it henceforth to slip as long as said first member continues to rotate in the one direction, a second stop adapted to restrain rotation of said second member after a small movement in the other direction and to cause it henceforth to slip as long as said first member continues to rotate in the other direction, said small movement being such that no impulse is transmitted before its completion, a pair of contacts attached to and spaced around said second member and a third fixed contact so arranged that said third contact makes contact with one of said pair of contacts when the second member is moved towards said first stop and with the other of said pair of contacts when the second member is moved against the second stop, said pair of contacts and said third contact being connected to control the modulating means in respect of its form determining property.

11. In a remote control system, the combination to form a sensing means of, a first rotatable member adapted to rotate accordingly as a control member is moved in each of two directions, a second rotatable member frictionally coupled to said first member and capable of rotation therewith, a first stop adapted to restrain rotation of said second member after a small movement in one direction and to cause it henceforth to slip as long as said first member continues to rotate in the one direction, a second stop adapted to restrain rotation of said second member after a small movement in the other direction and to cause it henceforth to slip as long as said first member continues to rotate in the other direction, a pair of contacts attached to and rotatable with said second member and a fixed contact so arranged that said third contact makes contact with one of said pair of contacts rotatable with said second member when the second member is moved towards said first stop and with the other of said pair of contacts when the second member is moved against the second stop, said pair of contacts and said third contact being connected to provide an output indicative of the direction of rotation of said control member.

12. A system in accordance with claim 2, wherein said means for controlling said apparatus comprises a movable element adapted to be coupled to control said apparatus, a first means adapted to move said element in one direction and a second means adapted to move said element in the opposite direction, said first means also being adapted to respond to the one part of the receiver output corresponding to one form of modulation and to move said movable element in one direction according to said one form of modulation and said second moving means being adapted to respond to the other part of the receiver output corresponding to the other form of modulation and to move said movable element in the opposite direction.

13. A system in accordance with claim 7, wherein said means for controlling said apparatus comprises a movable element adapted to be coupled to control said apparatus, a first means adapted to move said element in one direction and a second means adapted to move said element in the opposite direction, said first means also being adapted to respond to the one part of the receiver output corresponding to one modulation tone and to move said movable element in one direction according to said modulation tone and said second moving means also being adapted to respond to the other part of the receiver output corresponding to the other modulation tone and to move said movable element in the opposite direction.

14. A system in accordance with claim 7, wherein said sensing means comprises a first rotatable member adapted to rotate accordingly as the control member is moved in one direction or the other, a second rotatable member frictionally coupled to said first member and capable of rotation therewith, a first stop adapted to restrain rotation of said second member after a small movement in one direction and to cause it henceforth to slip as long as said first member continues to rotate in the one direction, a second stop adapted to restrain rotation of said second member after a small movement in the other direction and to cause it henceforth to slip as long as said first member continues to rotate in the other direction, said small movement being such that no impulse is transmitted before its completion, a pair of contacts attached to said second member and a third fixed contact so arranged that said third contact makes contact with one of said pair of contacts when the second member is moved towards said first stop and with the other of said pair of contacts when the second member is moved against the second stop, said pair of contacts being connected to control the modulating means in respect of its form determining property, said demodulating means comprises detection means adapted to derive from the modulated transmission received by said receiver tone pulses corresponding to the original modulation and tone detector means adapted to respond to said tone pulses and give a pulse output whose pulses correspond to said tone pulses, said means for effecting the desired control upon said apparatus being controlled by the pulse output signals according to the tone pulse from which each is derived and said means for controlling said apparatus comprises a two way stepping switch having separate stepping motors for each direction of stepping, and said output signals are connected to the appropriate stepping motor according to the tone from which each is derived.

15. A system in accordance with claim 7, wherein said sensing means comprises a first rotatable member adapted to rotate accordingly as the control member is moved in one direction or the other, a second rotatable member frictionally coupled to said first member and capable of rotation therewith, a first step adapted to restrain rotation of said second member after a small movement in one direction and to cause it henceforth to slip as long as said first member continues to rotate in the one direction, a second stop adapted to restrain rotation of said second member after a small movement in the other direction and to cause it henceforth to slip as long as said first member continues to rotate in the other direction, said small movement being such that no impulse is transmitted before its completion, a pair of contacts attached to said second member and a third fixed contact so arranged that said third contact makes contact with one of said pair of contacts when the second member is moved towards said first stop and with the other of said pair of contacts when the second member is moved against the second stop, said pair of contacts being connected to control the modulating means in respect of its form determining property, said demodulating means comprises detection means adapted to derive from the modulated transmission received by said receiver tone pulses corresponding to the original modulation and tone detector means adapted to respond to said tone pulses and give a pulse output whose pulses correspond to said tone pulses, said means for effecting the desired control upon said apparatus being controlled by the pulse output signals according to the tone pulse from which each is derived and said means for controlling said apparatus comprises a potentiometer the relative position of the slider and winding of which it is desired to set to correspond to the setting of said control member, a first stepping motor adapted to rotate the slider of the potentiometer in one direction and a second stepping motor adapted to rotate the winding of the potentiometer in the opposite direction, said stepping motors each being controlled by a different one of the two pulse outputs in the receiver.

16. A system in accordance with claim 14, including restoring means adapted to restore said means for effecting the desired control to its position corresponding to the datum position of the control member when said off-normal switch is in the operated state.

17. A system in accordance with claim 1, wherein said means for controlling said apparatus responds to a signal indicating the magnitude and sense of a controlling adjustment, said control member is movable about a datum position in each of two directions, and including modulating means in said control unit responsive to the sense and magnitude of the movement of said control member, whereby said modulating means effects modulation of the transmitter output by one tone which continues for the period in which a given controlling adjustment is required to continue in one sense, and by a second tone which continues for the period in which another controlling adjustment is required to continue in the opposite sense.

18. A system in accordance with claim 17, wherein said control unit comprises a sensing means capable of responding to change of direction of said control member to control the modulating means in respect of the choice of tone modulation according to the sense of the desired controlling adjustment.

19. A system in accordance with claim 18, wherein said sensing means comprises a first rotatable member adapted to rotate accordingly as the control member is moved in one direction or the other, a second rotatable member frictionally coupled to said first member and capable of rotation therewith, a first stop adapted to restrain rotation of said second member after a small movement in one direction and to cause it henceforth to slip as long as said first member continues to rotate in the one direction, a second stop adapted to restrain rotation of said second member after a small movement in the other direction and to cause it henceforth to slip as long as said first member continues to rotate in the other direction, a pair of contacts attached to said second member and a third fixed contact so arranged that said third contact makes contact with one of said pair of contacts when the second member is moved towards said first stop and with the other of said pair of contacts when the second member is moved against the second stop, said pair of contacts and said third contact being connected to control the choice of tone modulation.

References Cited in the file of this patent

UNITED STATES PATENTS

| | | |
|---|---|---|
| 373,915 | Woods | Nov. 29, 1897 |
| 887,357 | Stubblefield | May 12, 1908 |
| 1,760,479 | Colman | May 27, 1930 |
| 2,419,833 | Grimes | Apr. 29, 1947 |
| 2,422,973 | Martin | June 24, 1947 |
| 2,494,533 | Anthes | Jan. 17, 1950 |
| 2,529,804 | Harnischfeger et al. | Nov. 14, 1950 |
| 2,562,176 | Curry | July 31, 1951 |
| 2,576,424 | Sunstein | Nov. 27, 1951 |
| 2,589,998 | Dougherty et al. | Mar. 18, 1952 |
| 2,594,305 | Haller | Apr. 29, 1952 |